K. VON KANDO.
ELECTRIC RAILWAY VEHICLE.
APPLICATION FILED DEC. 9, 1914.
1,194,099.
Patented Aug. 8, 1916.
2 SHEETS—SHEET 1.
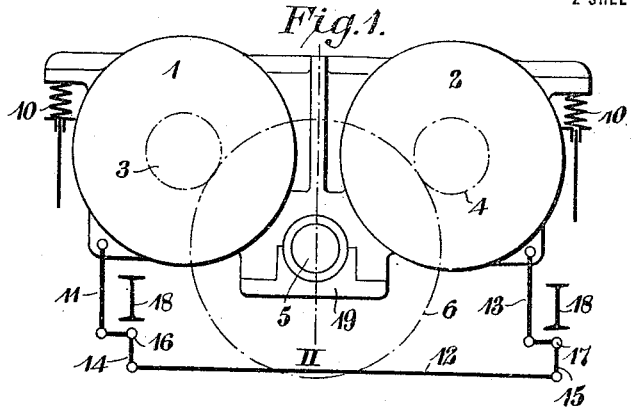
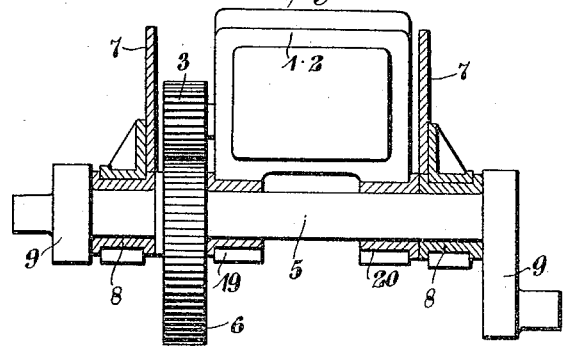
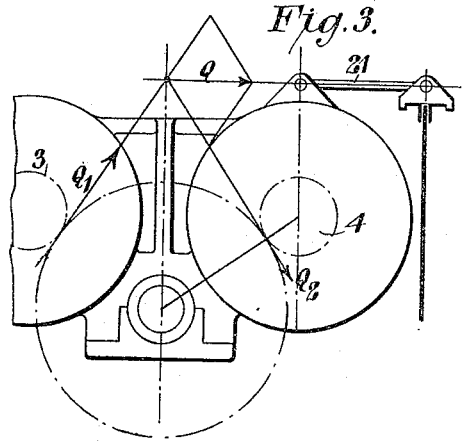
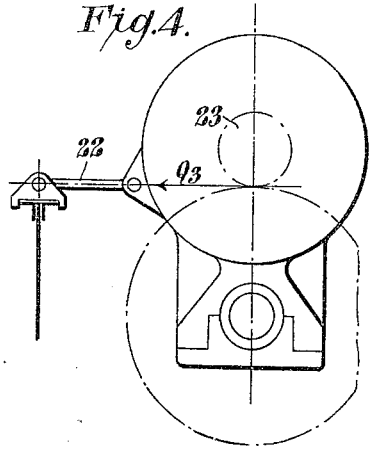
WITNESSES:
INVENTOR:
Kalman von Kando
BY
HIS ATTORNEY IN FACT

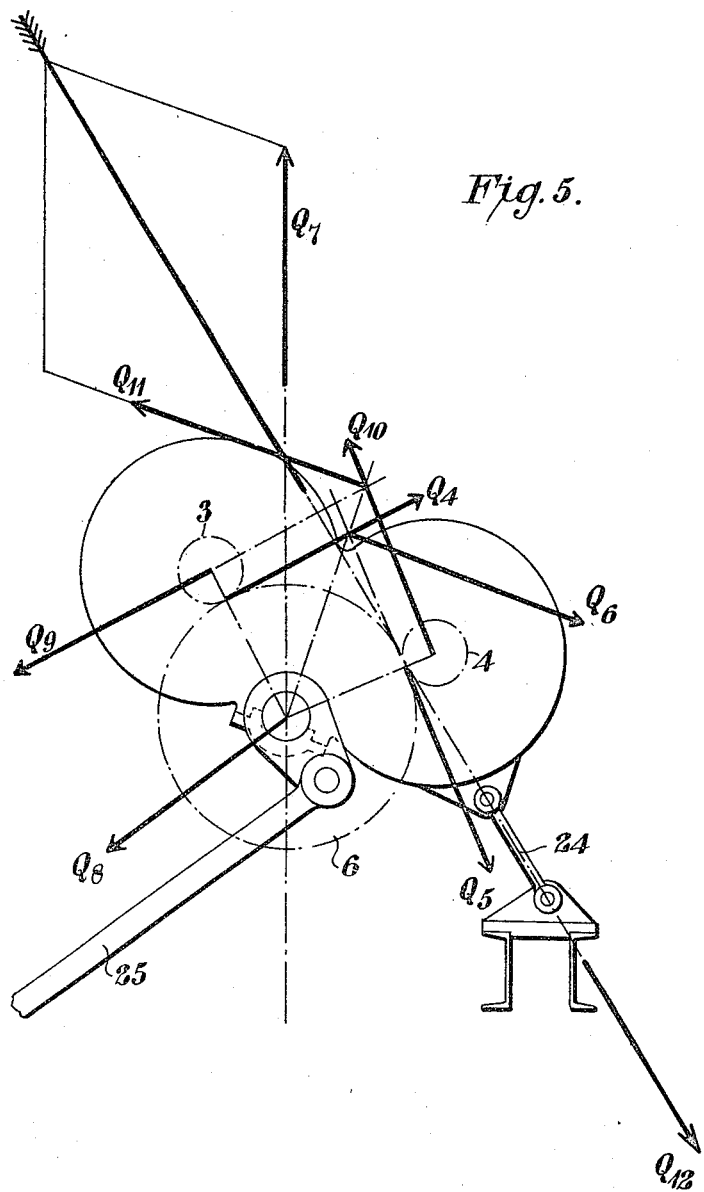

UNITED STATES PATENT OFFICE.

KALMAN von KANDO, OF VADO LIGURE, ITALY, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

ELECTRIC RAILWAY-VEHICLE.

1,194,099. Specification of Letters Patent. Patented Aug. 8, 1916.

Application filed December 9, 1914. Serial No. 876,381.

*To all whom it may concern:*

Be it known that I, KALMAN VON KANDO, a subject of the Emperor of Austria and of the King of Hungary, and a resident of Vado Ligure, in the Kingdom of Italy, have invented a new and useful Improvement in Electric Railway-Vehicles, of which the following is a specification.

This invention relates to electrically driven vehicles and comprises the improvements hereinafter described.

In electrically driven vehicles, a combination of toothed gears and connecting rods is often used as a driving connection between the motor or motors and the driving wheels, the motor driving an auxiliary or intermediate shaft by means of toothed gears and the intermediate shafts being provided with cranks and driving the wheels through connecting rods. This arrangement has, however, the disadvantage that the intermediate shaft from the outset requires a certain play in its bearings and this play becomes greater and greater as the bearing wears. Since the forces to which the cranks on the intermediate shaft are subjected are alternating and said cranks are arranged at ninety degrees apart, the shaft, through forces perpetually working on it, wears out its bearing and the greater the play is in the bearing the worse is the engagement of the toothed gears and a rapid deterioration and wear of the same results.

The object of the present invention is an arrangement of the motors which avoids this inconvenience.

The invention is illustrated in the accompanying drawings in which—

Figure 1 is a side view, somewhat diagrammatic, showing two motors arranged in accordance with the invention. Fig. 2 is an end view, partly sectional, of the same. Fig. 3 is a view similar to Fig. 1, showing an additional device hereinafter described, and Fig. 4 is a similar view showing this device applied to a single motor. Fig. 5 is a view similar to Fig. 1, showing an alternative method of connecting the motors to a frame and also illustrating the forces acting on the various parts.

Referring now to Figs. 1 and 2, the two motors 1, 2 drive the intermediate shaft 5 by means of toothed gears 3, 4 engaging with the toothed gear 6 mounted on said shaft. The intermediate shaft is supported in bearings 8, 8 carried by the locomotive frame 7. On each end of said shaft is secured cranks 9, 9 by means of which the driving wheels of the vehicle are driven by suitable connecting rods in a well known manner which requires no further description. The motors are not rigidly connected to the locomotive frame, in the ordinary manner, but rest on springs 10 which are so proportioned as to support the approximate weight of the said motors. Displacement or movement of the pair of motors is prevented by the rods 11, 12, 13 and bell crank levers 14, 15, the latter being pivoted on the parts 18 of the locomotive frame by means of pivots 16, 17. In order to obtain a correct engagement of the gears, the two motors are provided with two common bearings 19, 20 which surround the intermediate shaft 5, and it will be clear that neither the free play of the intermediate shaft 5 in its bearings 8, 8 nor the deformation and strain of the locomotive frame will interfere with the proper engagement of the toothed gears since each movement of the intermediate shaft relatively to the frame is followed by the motors which, in consequence, can always take the same position, this being due to the bearings 19, 20 surrounding the intermediate shaft 5. Displacement of the motor casings or stators can be prevented in such a manner that the bearings 19, 20 are completely relieved. For this purpose, it is sufficient to arrange the links preventing rotation of the motor casings or stators in line with the resultants of the circumferential forces transmitted through the toothed gears.

Fig. 3 shows the arrangement of the above mentioned links 21 which are arranged in the direction of the force Q, which is the resultant of the circumferential forces $Q_1$ and $Q_2$ of the toothed gears 3 and 4.

Fig. 4 shows a modification with a single motor where the links 22 are arranged in the direction of the circumferential force $Q_3$ of the toothed gears 23. With the mechanism indicated by the reference numerals 11, 12, 13, 14, 15, 16 and 17, (Fig. 1) the outer bearings 8, 8 (Fig. 2) are relieved of the forces arising from the pressure between the teeth of the driving gears. With the arrangement of the links 21 and 22, (Figs. 3 and 4) on the other hand, it is the inner bearings (19 and 20 Fig. 2) which are relieved of the forces arising from the tooth pressure. It may, however, be desired to divide these reactive forces between the bearings 8, 8 or 19, 20 for the following reason. It is a known fact that bearings which, under a certain pressure, obtain a good running surface as a result of the wear of the bush can carry a considerable load in the direction of this pressure, while a force applied in a different direction will move the shaft from the good running surface and cause it to rest on a point in the bearing bush where a good running surface is not found. Wear of the outer bearings (8, 8 Fig. 2) is principally due to the reaction forces of the connecting rod and, as a result of this, the shaft bears on a good running surface in the bush in the direction of the connecting rod. Consequently, in the event of a part of the reaction of the tooth pressure becoming transmitted through the outer bearing, it is advantageous to act upon these bearings in a direction parallel or nearly parallel with the connecting rod. The inner bearings 19, 20, on the contrary, carry the weight of the intermediate shaft and, therefore, it is advantageous for these to be acted upon in a vertical direction by the pressure due to the reaction of the teeth. The diagram Fig. 5 shows how these objects can be attained by the correct arrangement of the connecting link 24. In this diagram, $Q_4$ and $Q_5$ are the forces transmitted by toothed gears 3 and 4 to the toothed gear 6, and $Q_6$ is their resultant. This power brings about a reaction in the bearings (8, 8 19, 20) which is equal to the resultant $Q_6$ but opposite in direction. The force $Q_6$ can be resolved vertically and on a line parallel with the connecting rod 25, into the component forces $Q_7$ and $Q_8$, the latter acting on the outer bearings 8, 8 and the former on the inner bearings 19, 20. The force $Q_7$ is now combined with the resultant $Q_{11}$ of the reaction forces $Q_9$ and $Q_{10}$ acting on the motor bearings and the resultant $Q_{12}$ gives the direction in which the connecting links 24 must be arranged so that the above described objects are attained.

It is obvious that a vehicle may be furnished with more than one intermediate shaft and one, two or more motors can be arranged to drive each shaft through one, two or more toothed gears. These gears can be arranged inside the locomotive frame, as shown in Fig. 3, for example, or they can be located outside said frame in which case the nave of the toothed wheel can be formed as a crank.

What I claim is:—

1. In a railway vehicle, the combination of a crank shaft adapted to be connected to the driving wheels, an electric motor the stator of which is journaled on said crank shaft, toothed gears operatively connecting the rotor of said motor with said crank shaft, and a link in the line of the resultant force between the gears connecting the motor stator with the vehicle frame.

2. In a railway vehicle, the combination of a pair of electric motors the rotors of which are operatively connected through toothed gears with a common crank shaft and the stators of which are journaled on said crank shaft, resilient supporting means between the motor stators and the vehicle frame, interconnecting bell crank levers pivoted on said vehicle frame, and links connecting the motor stators to said bell crank levers.

3. In a railway vehicle, the combination of a crank shaft journaled in the vehicle frame and connected to the driving wheels through coupling rods, a pair of electric driving motors operatively connected to said crank shaft through toothed gearing and having their stators journaled on said crank shaft and resiliently connected to the vehicle frame, and a link in line with the resultant force due to the reaction of said toothed gearing connecting the stators of the motors to the vehicle frame.

4. In a railway vehicle, a crank shaft, a pair of electric motors having their stators mechanically connected and journaled on said crank shaft, toothed gearing between the rotors of said motors and said crank shaft, and a link between the vehicle frame and said motor stators in line with the resultant of the reactive forces due to the toothed gearing.

5. In a railway vehicle, a crank shaft, journaled in the vehicle frame, coupling rods between said crank shaft and the driving wheels, a pair of electric motors, toothed gears between said crank shaft and the rotors of said motors, means for mechanically connecting the stators of said motors and pivoting them on said crank shaft, and a link connecting the stators of the motors to the vehicle frame in line with the resultant of the forces due to the reaction of the toothed gears and the forces acting on the motor bearings due to the reaction in the coupling rods.

6. In an electric vehicle, the combination of a pair of motor rotors connected to a crank shaft by toothed gearing, a coöperating pair of motor stators mechanically connected and journaled on said crank shaft, and a link connecting said stators to the vehicle frame in line with the resultant forces arising from the vertical component of the reaction due to the tooth pressure between said gearing and the resultant of the forces which act on the motor bearings.

7. In an electric vehicle, the combination of a pair of motor rotors connected to a crank shaft by toothed gearing, a coöperating pair of mechanically connected motor stators resiliently supported from the vehicle frame and journaled on said crank shaft, and a link connecting said stators to the vehicle frame in line with the resultant forces arising from the vertical component of the reaction due to the tooth pressure between said gearing and the resultant of the forces which act on the motor bearings.

8. In a vehicle, the combination of a driving shaft, adapted to be connected to driving wheels of the vehicle, an electric motor the stator of which is journaled on the shaft, gears operatively connecting the rotor of the motor with said shaft, and a link pivotally connected to the frame of the vehicle and to the stator of the motor and extending in the line of the resultant force between the gears, for holding the motor in an operative position relatively to said shaft.

In testimony whereof I have hereunto subscribed my name this 28th day of October 1914.

KALMAN von KANDO.

Witnesses:
C. A. SERRANI,
A. BORAGINO.

Copies of this patent may be obtained for five cents each, by addressing the "Commissioner of Patents, Washington, D. C."